United States Patent
De Meutter et al.

(10) Patent No.: US 11,993,082 B2
(45) Date of Patent: May 28, 2024

(54) INKJET PRINTING METHODS AND INKJET PRINTING SYSTEMS

(71) Applicant: AGFA NV, Mortsel (BE)

(72) Inventors: Stefaan De Meutter, Mortsel (BE); David Tilemans, Mortsel (BE); Jens Lenaerts, Mortsel (BE)

(73) Assignee: Agfa NV, Mortsel (BE)

( * ) Notice: Subject to any disclaimer, the term of this patent is extended or adjusted under 35 U.S.C. 154(b) by 27 days.

(21) Appl. No.: 17/915,563

(22) PCT Filed: Mar. 5, 2021

(86) PCT No.: PCT/EP2021/055548
§ 371 (c)(1),
(2) Date: Sep. 29, 2022

(87) PCT Pub. No.: WO2021/197756
PCT Pub. Date: Oct. 7, 2021

(65) Prior Publication Data
US 2023/0141947 A1      May 11, 2023

(30) Foreign Application Priority Data
Mar. 30, 2020   (EP) .................... 20166543

(51) Int. Cl.
*B41J 2/045* (2006.01)
*B41J 2/14* (2006.01)

(52) U.S. Cl.
CPC ....... *B41J 2/04575* (2013.01); *B41J 2/14008* (2013.01)

(58) Field of Classification Search
CPC ............... B41J 2/04575; B41J 2/14008; B41J 2/04588; B41J 2/04581; B41J 2/04516;
(Continued)

(56) References Cited

U.S. PATENT DOCUMENTS

2006/0125856 A1* 6/2006 Kitami ............... B41J 2/04596
                                                                    347/10
2010/0110127 A1* 5/2010 Fukuda ................ B41J 29/38
                                                                    347/10
(Continued)

FOREIGN PATENT DOCUMENTS

| EP | 0968822 A2 | 1/2000 |
|---|---|---|
| WO | WO 2009/080684 A1 | 7/2009 |
| WO | WO 2015/023363 A1 | 2/2015 |

OTHER PUBLICATIONS

European Patent Office, International Search Report in International Patent Application No. PCT/EP2021/055548, dated May 25, 2021, 4 pp.

(Continued)

*Primary Examiner* — Kristal Feggins
(74) *Attorney, Agent, or Firm* — Leydig, Voit & Mayer, Ltd.

(57) ABSTRACT

A grayscale inkjet printing method including the steps of: a) supplying a pigmented inkjet ink to a grayscale print head having nozzles with an outer nozzle surface area smaller than 500 μm² and having an acoustic resonance period ARP of not more than 5.5 μs; and b) applying a voltage wave form for ejecting pigmented inkjet ink from a nozzle of the grayscale print head within one jetting cycle; wherein the pigmented inkjet ink has a viscosity of at least 3.8 mPa·s at jetting temperature and a shear rate of 1,000 s$^{-1}$; wherein the voltage wave form for ejecting the largest ink droplet includes, in chronological order, a first ejecting pulse having an amplitude A1 and a second ejecting pulse having an amplitude A3 with the amplitude A1 complying with the relationship: 0.50×A3<A1<1.40×A3; and wherein a time period between the end time of the first ejecting pulse and the end time of the second ejecting pulse defines an idle time period including no other ejecting pulse, the time period (Continued)

having a duration between 1.5 to 2.5 times the acoustic resonance period ARP; and wherein any non-ejecting pulse having an amplitude A2 present during the idle time period complies with the relationship: $A2 \leq 0.15 \times A3$. An inkjet printing system is also disclosed.

20 Claims, 3 Drawing Sheets

(58) Field of Classification Search
CPC .. B41J 2/04595; B41J 2/04596; B41J 2/0459; B41J 2/04591; B41J 2/12; B41J 2/125; B41J 2/04505; B41J 2/04508; B41J 2/04526; B41J 2/04556; B41J 2/04558; B41M 5/52; B41M 5/5218; B41M 5/5245; B41M 5/5254; B41M 7/0027; C09D 11/40
See application file for complete search history.

(56) References Cited

U.S. PATENT DOCUMENTS

| | | |
|---|---|---|
| 2010/0328381 A1 | 12/2010 | Kuki et al. |
| 2012/0306954 A1 | 12/2012 | Nishikawa |
| 2013/0083106 A1 | 4/2013 | Tsukamoto |
| 2014/0240384 A1* | 8/2014 | Yokomaku ........... B41J 2/04588 347/11 |
| 2016/0214395 A1 | 7/2016 | Torfs et al. |
| 2017/0282555 A1 | 10/2017 | De Meutter et al. |
| 2018/0215939 A1 | 8/2018 | Mizuno |

OTHER PUBLICATIONS

European Patent Office, Written Opinion in International Patent Application No. PCT/EP2021/055548, dated May 25, 2021, 6 pp.

* cited by examiner

INKJET PRINTING METHODS AND INKJET PRINTING SYSTEMS

CROSS-REFERENCE TO RELATED APPLICATIONS

This patent application is the U.S. national phase of copending International Patent Application No. PCT/EP2021/055548, filed Mar. 5, 2021, which claims the benefit of European Patent Application No. 20166543.7, filed Mar. 30, 2020.

TECHNICAL FIELD

The present invention relates to inkjet printing methods and inkjet printing systems employing specific wave forms and pigmented inkjet inks.

BACKGROUND ART

Industrial inkjet printing systems are replacing gravure, flexographic and offset printing systems because of their advantages in variable printing and short set-up time, which allows for just-in-time manufacturing, short production runs and personalized products. These inkjet printing systems must meet high reliability and productivity requirements. Important factors in meeting these requirements are the wave forms and the inkjet inks.

A wave form is a set of timed actuator movements used to propagate and control acoustic pressure waves within an ink chamber of a grayscale print head to eject an ink droplet through a nozzle. For example, a wave form can operate at a frequency of 30 kiloHertz (kHz) and generate three different sized droplets by selectively activating different pulses of the wave form. It is the aim to eject the different droplets at approximately the same drop speed.

Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, creating a pressure wave which leads to the formation of a drop ejected from the nozzle of a print head. Piezo inkjet printing heads may use fast rise-time and high amplitude electrical drive pulses to launch large pressure wave pulses in order to eject fast ink drops (high drop velocity).

A wave form is also tuned to an inkjet ink, but the total acoustic energy in an ink chamber may be much larger than the energy required to release an ink drop. The excess energy is a source of uncontrolled release of satellite drops, interference with subsequent drops, different droplet velocities and cross talk between nozzles, which all deteriorate the jetting performance of a print head.

Smaller ink droplets are used to improve the image quality, which means that more ink droplets per dot have to be deposited. Consequently, wave forms have to operate at a high frequency, e.g. 60 kHz or more, in order to achieve a printing speed of 100 to 150 m/min. The higher the printing frequency, the more likely that the pressure in the ink chamber is not yet damped to zero when the next drop and pressure wave comes along, and thus the greater the potential for obtaining poor jetting performance.

Extensive development of wave forms and inkjet inks has occurred for low frequencies, as illustrated by US 2010328381 (KONICA MINOLTA) for about 20 kHz and by WO 2015/023363 (FUJIFILM DIMATIX) for about 30 kHz. However, for a high frequency of 60 kHz or more, there is still a need for suitable wave forms and inkjet inks so that reliable inkjet printing with good jetting performance can be performed at high printing speeds and good image quality.

SUMMARY OF INVENTION

In order to overcome the problems described above, preferred embodiments of the present invention have been realised with an inkjet printing method as defined by claim 1.

It was surprisingly found that by including a specific idle time period between two ejecting pulses, large ink droplets of a specific inkjet ink could be ejected in a reliable manner using only 2 sub-drops, where normally 3 sub-drops where necessary. This allowed to increase the frequency of the grayscale print head and to operate reliably at three gray levels instead of four, while having minimal effect on image quality.

One object of the invention is to provide an inkjet printing system for reliable printing a high jetting frequency.

Another object of the invention is to provide improved industrial manufacturing methods employing inkjet printing methods and systems in accordance with the invention.

Further advantages and embodiments of the present invention will become apparent from the following description.

BRIEF DESCRIPTION OF DRAWINGS

FIG. 2 is a schematic representation of a cross section of a single piezoelectric drop on demand grayscale print head module. This module 10 includes an actuator 11 glued to a module body 12, where ink enters the module 10 via the ink supply 16 and is directed via an impedance feature 20 to an ink chamber 15. Ink is pressurized in the ink chamber 15 by an actuator 11 and directed to an outer nozzle aperture 14 from which droplets are ejected through the nozzle plate 13. The actuator 11 includes a piezoelectric layer 17, whose shape can be modified by applying a voltage wave form to the metal layers attached to the surface of the piezoelectric layer 17, the latter often having a thickness of about 20 µm. A metal layer on the piezoelectric layer 17 forms a ground electrode 18. An upper metal layer on the piezoelectric layer 17 forms a drive electrode 19.

DEFINITIONS

The term "acoustic resonance period" (ARP) of a print head is the time period that refers to the time that it takes for a pressure wave to travel both ways in an ink chamber. It is a characteristic for each print head type and can differ depending on the ink used. The period is namely related to the speed of sound in the ink. The acoustic resonance period can be measured by changing the timing between two ceramic movements in a single drop wave form.

The term "jetting cycle" is the time to perform recording of one pixel (one droplet deposition point) of an image to be printed. The jetting cycle may encompass multiple acoustic resonance periods containing or lacking a pulse.

DESCRIPTION OF EMBODIMENTS

Inkjet Printing Methods

A preferred embodiment of the invention is an grayscale inkjet printing method including the steps of a) supplying a pigmented inkjet ink to a grayscale print head having nozzles with an outer nozzle surface area smaller than 500 µm² and having an acoustic resonance period ARP of not more than 5.5 µs; and b) applying a voltage wave form for ejecting pigmented inkjet ink from a nozzle of the grayscale print head within one jetting cycle;
wherein the pigmented inkjet ink has a viscosity of at least 3.8 mPa·s at jetting temperature and a shear rate of 1,000 s⁻¹;
wherein the voltage wave form for ejecting the largest ink droplet includes, in chronological order, a first ejecting pulse having an amplitude A1 and a second ejecting pulse having an amplitude A3 with the amplitude A1 complying with the relationship:

$$0.50 \times A3 < A1 < 1.40 \times A3; \text{ and}$$

wherein a time period between the end time of the first ejecting pulse and the end time of the second ejecting pulse defines an idle time period including no other ejecting pulse, the time period having a duration between 1.5 to 2.5 times the acoustic resonance period ARP; and wherein any non-ejecting pulse having an amplitude A2 present during the idle time period complies with the relationship: $A2 \leq 0.15 \times A3$.

The idle time period may include a non-ejecting pulse complying with the relationship: $A2 \leq 0.15 \times A3$, but preferably no pulse is present during the idle time period.

In a more preferred embodiment, the relationship for the ejecting pulses having amplitude A1 and A3 is preferably $0.65 \times A3 < A1 < 0.90 \times A3$, more preferably $0.75 \times A3 < A1 < 0.85 \times A3$. In the latter ranges, usually no satellites are observed.

Figure 1:
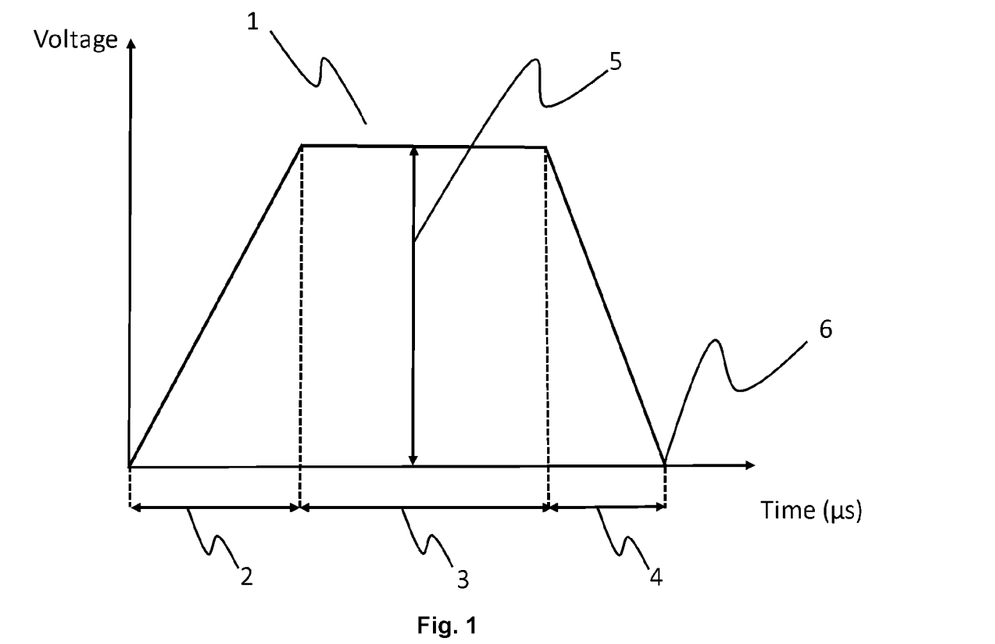
FIG. 1 illustrates a pulse 1 of a wave form having a rising time 2 to reach a certain voltage, a dwell time 3 for maintaining the voltage and a falling time 4 for removing the voltage applied. The voltage applied gives the pulse its amplitude 5. The moment at which the voltage is no longer applied is called the end time 6 of the pulse.
Figure 2:
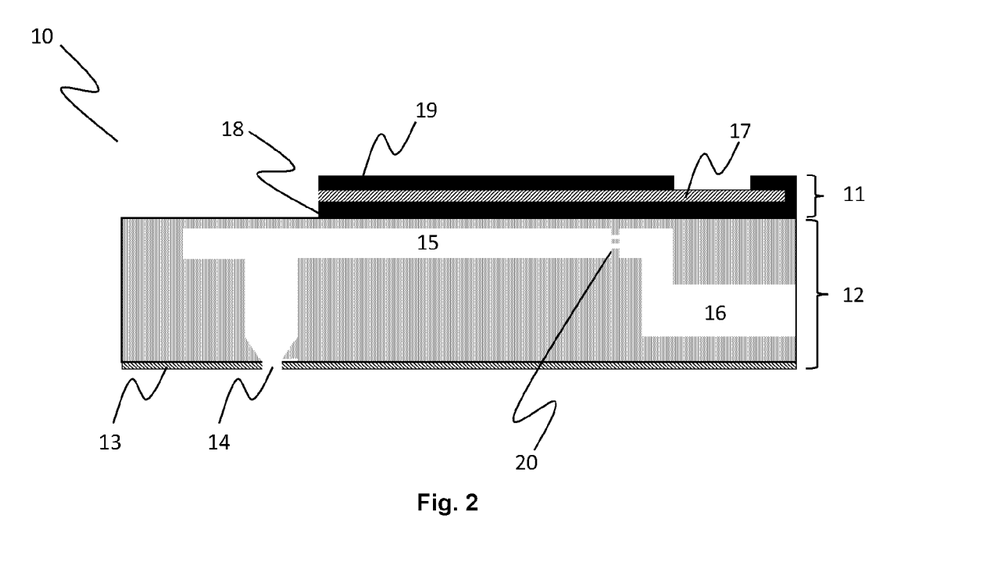

A print head usually contains several hundreds of modules 10 as illustrated in FIG. 2. As shown by FIG. 2, the nozzle in a nozzle plate 13 usually has an outer nozzle aperture 14 that is smaller than the inner nozzle aperture. The inner nozzle aperture is the aperture facing the ink chamber 15, while the outer nozzle aperture 14 faces the outside environment of the print head. The shape of the nozzle aperture is usually circular, oval, square or rectangular, but may have other more complex shapes.

The nozzle surface area NS is calculated based on the dimensions of the outer nozzle using well-known mathematical formulas for surface areas. For example, in case of a circular nozzle, the nozzle surface area NS is calculated by the formula: $NS = \pi \times r^2$, wherein the radius r is half of the outer nozzle diameter.

In the present invention, the grayscale print heads have nozzles with an outer nozzle surface area NS smaller than 500 µm², preferably between 100 and 350 µm², more preferably between 150 and 300 µm² and most preferably between 200 and 250 µm². In these ranges, the grayscale print heads can produce images of excellent image quality.

The grayscale print head is preferably a piezoelectric print head, more preferably a piezo electric through-flow print head. In a through-flow print head, often also called a recirculating print head, the ink flows continuously via an ink inlet through the ink chamber and exits the nozzle only when required, otherwise the ink continuously exits the ink channel via an ink outlet of the print head. The other type of print head is a so-called end shooter print head or single ended print head, wherein the ink flows via an ink inlet of the print head into the ink chamber and can only exit through a nozzle.

Commercial examples of end shooter print heads are, for example, the piezoelectric print heads Gen5 and Gen5S from RICOH and KJ4B from KYOCERA. Suitable piezoelectric through-flow print heads for obtaining the invention are the print heads Samba G3L and G5L from FUJI DIMATIX and the through-flow print heads from XAAR.

In a preferred embodiment of the grayscale inkjet printing method, the grayscale print head is a piezoelectric through-flow print head. Such a print head exhibits an improved reliability, as the ink in the ink chamber remains in motion, thereby preventing or at least reducing the clogging of the print head by sedimentation of the pigments in the inkjet ink after a prolonged time period without firing through the nozzle and automatically removing air bubbles created by rectified diffusion at higher fire frequencies.

In a multi-pass inkjet printing process, the inkjet print head scans back and forth in a transversal direction across the moving ink-receiving substrate. If the print head moves outside the area of the substrate, all print head nozzles can be fired simultaneously ("spitting") into a service station spittoon, whereby all nozzles are purged, thereby reapplying moisture and unblocking nozzles. This results in a small waste of ink, but no waste of substrate.

Single pass inkjet printing can be executed by using page wide inkjet print heads or multiple staggered inkjet print heads, which cover the entire width of the ink-receiving surface. In a single pass printing process, the inkjet print heads usually remain stationary, while the substrate is transported under the inkjet print heads. As the print heads are positioned above the substrate, the spitting of inkjet ink for purging the print head nozzles would in addition to waste of ink also lead to a waste of substrate. Furthermore, a time consuming removal of such substrate parts not printed with the desired image is also required. Hence, an improved productivity using through-flow print heads was especially observed when the grayscale inkjet printing method is a single pass inkjet printing method.

In a preferred embodiment of the grayscale inkjet printing method, the grayscale inkjet printing method is a single pass grayscale inkjet printing method, as it allows to maximize productivity compared to multi-pass inkjet printing.

In grayscale print heads, a wave form applied to the electrodes of a module is capable of forming multiple ink drops that can combine after leaving the ink nozzle into a larger ink droplet. Large ink droplets are necessary when a large ink laydown is required, while a small ink droplet is necessary for high resolution and low graininess. As a rule of thumb, the volume of the large droplet should be preferably about 1.6 to 2.4 times larger than the volume of the small droplet for printing a good image quality in a productive manner. In order to achieve this ratio, grayscale print heads normally require three ink drops to be combined into the large ink droplet. In the latter case, also a medium sized ink droplet consisting of two ink drops and having a size between that of the small ink droplet and the large droplet is available, but was found to be of no real use to improve image quality or productivity.

In the present invention, it was surprisingly found that by adapting the jetting viscosity of a pigmented inkjet ink to a viscosity of at least 3.8 mPa·s at jetting temperature and a shear rate of 1,000 s$^{-1}$ and using a very specific wave form that two ink drops sufficed to reach the large ink droplet having the desired 1.6 to 2.4 ratio over small ink droplets. The voltage wave form for ejecting the largest ink droplet includes, in chronological order, a first ejecting pulse having an amplitude A1 and a second ejecting pulse having an amplitude A3 with the amplitude A1 complying with the relationship: $0.50 \times A3 < A1 < 1.40 \times A3$; and a time period between the end time of the first ejecting pulse and the end time of the second ejecting pulse defines an idle time period including no other ejecting pulse, the time period having a duration between 1.5 to 2.5 times the acoustic resonance period ARP, most preferably having a duration of about twice the ARP.

It is assumed that during this idle period the ink chamber fills itself with more ink than when an ejecting pulse is applied in each of three consecutive acoustic resonance periods. Furthermore, when a pulse is applied in each of three consecutive acoustic resonance periods, this generates considerably more excess acoustic energy in the ink chamber. The latter makes the application of a so-called cancellation pulse in an additional ARP necessary to damp the pressure in the ink chamber before the next drop and pressure wave comes along, as this would otherwise result in a poor jetting performance, such as occurrence of satellites and differing drop velocities. The extra cancellation pulse in an additional acoustic resonance period also reduces the printing frequency (kHz), and hence also the printing speed (m/min). All this is illustrated in the Examples here below. The idle time period may include a non-ejecting pulse, but preferably the idle time period is without any pulse.

When no ink droplet has to be ejected, preferably also a pulse is applied. Such a pulse causes the fluid meniscus in the nozzle to move in response to the pulse without ejecting a droplet. Such a non-ejecting pulse is often referred to as a "tickle pulse." By applying a tickle pulse, the effects of fluid evaporation from a nozzle can be reduced, which minimizes the chance that a nozzle will dry out. This can be particularly advantageous when jetting highly volatile inks, such as aqueous or solvent-based inkjet inks, and/or when an inkjet nozzle remains inactive for an extended period of time during operation. Increasing 'latency', i.e. the length of time that an inactive nozzle remains capable of being restarted with optimal jetting performance, improves the reliability of the inkjet printing process. Such a tickle pulse is especially useful in single pass inkjet printing, where a nozzle failure creates a line artefact in the printed image. In multi-pass inkjet printing a nozzle failure can be masked in the multiple passes by neighbouring nozzles printing.

In a preferred embodiment for ejecting no ink droplet or small ink droplets, a tickle pulse is applied by a voltage wave form including a non-ejecting pulse having an amplitude A2 complying with the relationship: $0.10 \times A3 < A2 < 0.30 \times A3$. If the amplitude A2 is smaller than $0.10 \times A3$ then no improvement in latency is observed. For an amplitude larger than $0.30 \times A3$, a droplet might still be jetted from the nozzle by the application of the non-ejecting pulse.

In the present invention, a small ink droplet is preferably ejected by applying a voltage wave form for ejecting the pigmented inkjet ink from a nozzle of the grayscale print head within one jetting cycle, wherein the voltage wave form preferably includes, in chronological order, a non-ejecting pulse having an amplitude A2 complying with the relationship: $0.10 \times A3 < A2 < 0.30 \times A3$ and an ejecting pulse having an amplitude A3.

The voltage wave form can be applied to the ink jet module periodically, corresponding to each jetting cycle of the module. In a preferred embodiment of the grayscale inkjet printing method, the jetting cycle is equal to about three times the acoustic resonance period ARP. If the acoustic resonance period then has a duration of no more than 5.5 µs, a jetting frequency higher than 60 kHz can be obtained, which allows for high speed printing.

In producing the large ink droplet, the time period defining the idle time period between the first ejecting pulse having an amplitude A1 and a second ejecting pulse having an amplitude A3 has a duration between 1.5 to 2.5 times the acoustic resonance period. In a preferred embodiment of the grayscale inkjet printing method, the time period defining the idle time period is equal to twice the acoustic resonance period, as for this period optimal jetting performance is obtained.

In the wave forms in accordance with the invention, the dwell time of an ejecting pulse preferably has a duration between 20% and 60%, more preferably a duration between 30% and 50% of the ARP.

Inkjet Printing Systems

The inkjet printing system is preferably configured to perform all the grayscale inkjet printing methods described here above.

A preferred embodiment of the invention is an inkjet printing system comprising: a) a piezoelectric through flow grayscale print head including modules 10 having a nozzle 14 with an outer nozzle surface area smaller than 500 µm$^2$, an ink chamber 15 connected the nozzle 14, and an actuator 11 connected to the ink chamber to vary a volume of the ink chamber, wherein the ink chamber has an acoustic resonance period (ARP) of not more than 5.5 µs and is supplied with a pigmented inkjet ink having a viscosity of at least 3.8 mPa·s at jetting temperature and a shear rate of 1,000 s$^{-1}$; and b) a voltage wave form generating device configured to generate a voltage wave form for ejecting the largest ink droplet within one jetting cycle including, in chronological order, a first ejecting pulse having an amplitude A1 and a second ejecting pulse having an amplitude A3 with the amplitude A1 complying with the relationship $0.50 \times A3 < A1 < 1.40 \times A3$, preferably $0.65 \times A3 < A1 < 0.90 \times A3$; and wherein a time period between the end time of the first ejecting pulse and the end time of the second ejecting pulse defines an idle time period including no other ejecting pulse, the time period having a duration between 1.5 to 2.5 times the acoustic resonance period ARP; and wherein any non-ejecting pulse having an amplitude A2 present during the idle time period complies with the relationship $A2 \leq 0.15 \times A3$. The idle time period may include a non-ejecting pulse, but preferably the idle time period is without a pulse.

In a preferred embodiment of the inkjet printing system, the voltage wave form generating device is further configured to generate a voltage wave form for not ejecting the pigmented inkjet ink from a nozzle of the grayscale print head within one jetting cycle, wherein the voltage wave form includes a non-ejecting pulse having an amplitude A2 complying with the relationship: $0.10 \times A3 < A2 < 0.30 \times A3$; and/or is further configured to generate a voltage wave form for ejecting the pigmented inkjet ink from a nozzle of the grayscale print head within one jetting cycle, wherein the voltage wave form includes, in chronological order, a non-ejecting pulse having an amplitude A2 complying with the relationship: $0.10 \times A3 < A2 < 0.30 \times A3$ and an ejecting pulse having an amplitude A3.

In a preferred embodiment of the inkjet printing system, the jetting cycle is equal to about three times the acoustic resonance period ARP and/or the acoustic resonance period ARP has a duration of no more than 5.5 µs, preferably between 3.0 µs and 5.2 µs, more preferably between 4.0 to 4.8 µs.

There is no restriction to the piezoelectric material used in actuators of piezoelectric print heads, provided that deformation occurs when voltage is applied. Preferred piezoelectric material includes PZT ($PbZrO_3$—$PbTiO_3$) and third component added PZT. The third component contains $Pb(Mg1/3Nb2/3)O_3$, $Pb(Mn1/3Sb2/3)O_3$, $Pb(Co1/3Nb2/3)O_3$. Further, $BaTiO_3$, $ZnO$, $LiNbO_3$ and $LiTaO_3$ can also be used to produce it.

As a material for the nozzle plate 13 in FIG. 2, preferably silicon is used or alternatively a synthetic resin or metal. Preferred synthetic resins include polyimide resin, polyethylene terephthalate resin, liquid crystal polymer, aromatic polyamide resin, polyethylene naphthalate resin, and polysulphone resin is used. As a metal material, preferably stainless steel is used. The synthetic resin or metal nozzle plate preferably have a non-wetting coating.

Pigmented Inkjet Inks

The pigmented inkjet ink has a viscosity of at least 3.8 mPa·s at jetting temperature and a shear rate of $1,000 \, s^{-1}$, and preferably the viscosity is in the range of 4.0 to 6.0 mPa·s.

The pigmented inkjet ink can be a UV curable or solvent-based inkjet ink, but is preferably an aqueous pigmented inkjet ink. UV curable inkjet inks contain one or more photoinitiators and polymerizable compounds, often acrylates, which may cause health risks, for example, in food packaging. Solvent-based inkjet inks generally cause problems for the environment and also explosion risks due to volatility of the organic solvents.

The aqueous pigmented inkjet ink has a viscosity of at least 3.8 mPa·s at jetting temperature and a shear rate of $1,000 \, s^{-1}$, and preferably the viscosity is in the range of 4.0 to 6.0 mPa·s. A major component in the aqueous pigmented inkjet ink is water. When water is heated, it starts to evaporate. Such evaporation occurs also at the nozzle of the print head. Therefore, the jetting temperature is preferably not too high in order to limit evaporation at the nozzle. The latter occurs especially during prolonged non-jetting periods and negatively impacts the jetting performance, e.g. by viscosity variation of the ink in the nozzle or even clogging of the nozzle. On the other hand, the jetting temperature may also not be too low, as also viscosity variations can occur by the changes in room temperature (e.g. summer versus winter) of the room wherein the inkjet printer is operated. The jetting temperature is preferably at least 25° C., as the energy cost for conditioning the printer room generally remains limited and so productivity is not too much affected.

In a preferred embodiment of the grayscale inkjet printing method, the aqueous pigmented inkjet ink is ejected at a jetting temperature between 28° C. and 42° C., more preferably between 30° C. and 38° C., as then often no airconditioning is necessary in the room wherein the inkjet printer is operated and also evaporation at the nozzle is limited.

Latency due to evaporation can also be addressed by including one or more organic solvents having a higher boiling point than water. However, large amounts of such organic solvents also reduce the productivity as it takes longer time to dry the inkjet printed samples. Hence, in a preferred embodiment of the grayscale inkjet printing method, the water content of the aqueous pigmented inkjet ink is at least 50 wt % based on the total weight of the aqueous pigmented inkjet ink, more preferably the water content is between 52 wt % and 70 wt % based on the total weight of the aqueous pigmented inkjet ink. The liquid medium of the aqueous pigmented inkjet ink having a water content of not more than 70 wt % can then still be easily complemented with one or more organic solvents having a higher boiling point and having also a higher viscosity than water, in order to achieve a viscosity of at least 3.8 mPa·s at jetting temperature and a shear rate of $1,000 \, s^{-1}$.

Colour Pigments

For reasons of light fastness, the colorants in the aqueous pigmented inkjet inks preferably includes colour pigments instead of only dyes. Organic and/or inorganic pigments may be used, but preferably organic colour pigments are used because they allow to maximize colour gamut. A single pigment or a mixture of pigments may be used in the aqueous inkjet inks.

Suitable colour pigments may be chosen from those disclosed by HERBST, Willy, et al. Industrial Organic Pigments, Production, Properties, Applications. 3rd edition. Wiley—VCH, 2004. ISBN 3527305769.

The selection of colour pigments is often determined by the application. For example, if the images to be reproduced are reproductions of wood then preferably a CRYK inkjet ink set is used instead of a CMYK inkjet ink set.

Another cause of latency is a sub-optimal dispersion of the colour pigment. Colour pigments are usually dispersed with polymeric dispersants having hydrophobic anchor parts adhering to the hydrophobic surface of the colour pigment particles and hydrophilic parts dissolved in the aqueous dispersion medium for realizing steric stabilization of the colour pigment. The following pigments were found to be suitable for achieving good dispersion and thus good productivity of the grayscale inkjet printing method:

for a cyan aqueous inkjet ink: a beta-copper phthalocyanine pigment, preferably C.I. Pigment Blue 15:3;

for a red aqueous inkjet ink: a pigment selected from the group consisting of C.I. Pigment Red 57/1, C.I. Pigment Red 122, C.I. Pigment Red 170, C.I. Pigment Red 175, C.I. Pigment Red 176, C.I. Pigment Red 187, C.I. Pigment Red 188, C.I. Pigment Red 207, C.I. Pigment Red 242, C.I. Pigment Red 254, C.I. Pigment Red 272 and mixed crystals thereof;

for a yellow aqueous inkjet ink: a pigment selected from C.I. Pigment Yellow 74 C.I. Pigment Yellow 83, C.I. Pigment Yellow 97, C.I. Pigment Yellow 110, C.I. Pigment Yellow 120, C.I. Pigment Yellow 138, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof; and for a black aqueous inkjet ink: a carbon black pigment.

The pigment particles in the pigmented inkjet ink should be sufficiently small to permit free flow of the ink through the inkjet printing device, especially at the ejecting nozzles. The average particle diameter APD is preferably smaller than 200 nm, more preferably smaller than 160 nm for achieving good jetting performance. It is also desirable to filter the aqueous inkjet inks to eliminate oversizers with a filter having a pore size of 1 µm, preferably 0.5 µm.

For printing wood colours, it was observed that considerably less cyan ink is required compared to red ink or yellow ink. For improving the graininess of a printed wood image, it is advantageous that the cyan ink contains less pigment than the red or yellow inkjet ink. Thus, for obtaining a good image quality, the aqueous CRYK pigmented inkjet ink set preferably complies with the relationship: wt % (cyan)<wt % (red)≤wt % (yellow), wherein the wt % (cyan) is the weight percentage of the cyan pigment in the cyan aqueous inkjet ink, the wt % (red) is the weight percentage of the red pigment in the red aqueous inkjet ink and the wt % (yellow) is weight percentage of the yellow pigment in the yellow aqueous inkjet ink, wherein all weight percentages (wt %) are based on the total weight of the aqueous pigmented inkjet ink.

In a particularly preferred embodiment, the aqueous CRYK inkjet ink set was designed to have optimal pigment concentration in each inkjet ink for obtaining good image quality over a broad range of wood colour patterns, while simultaneously productivity is maintained. Therefore, the cyan aqueous inkjet ink preferably contains 1.5 to 2.5 wt % of a beta-copper phthalocyanine pigment, wherein the weight percentage (wt %) is based on the total weight of the cyan inkjet ink. The red aqueous inkjet ink preferably contains 2.0 to 4.0 wt % of red pigment, wherein the weight percentage (wt %) is based on the total weight of the red inkjet ink. The yellow aqueous inkjet ink preferably contains 3.0 to 5.0 wt % of yellow pigment, wherein the weight percentage (wt %) is based on the total weight of the yellow inkjet ink.

A black aqueous inkjet ink may be used in inkjet printing for under colour removal (UCR). UCR is a process of eliminating overlapping yellow, magenta, and cyan and replacing them with black ink only, during the colour separation process. It was found advantageous to have the pigment concentration in the black inkjet ink somewhat comparable to that of the red aqueous inkjet ink and preferably in between the pigment concentration of the red and yellow inks. The black aqueous inkjet ink preferably contains 2.2 to 5.0 wt %, more preferably 2.4 to 4.0 wt % of a carbon black pigment; wherein the weight percentage (wt %) is based on the total weight of the black inkjet ink. If the carbon black pigment concentration is less than 2.2 or 2.4 wt % then for some darker wood patterns too much black ink is necessary, which reduces productivity (more ink, more drying). If the carbon black pigment concentration is more than 4.0 or even 5.0 wt %, then a reduced image quality is obtained due to increased graininess, especially for pale wood motifs.

The aqueous inkjet ink set used in the inkjet printing method according to the present invention preferably consists of the above described cyan, red, yellow and black aqueous pigmented inkjet inks. Such an aqueous inkjet ink set allows to have a more than sufficient colour gamut at an acceptable equipment and maintenance cost, especially for single pass inkjet printers having a print width of more than 1.5 m or even more than 2 m. For single pass printing, the entire printing width needs to be covered by print heads for each colour, so a smaller number of differently coloured inks reduces the cost substantially.

If superior quality on graininess is required, one or more aqueous light inkjet inks may be added to the aqueous pigmented inkjet ink set. A light inkjet ink preferably has the same pigment as in a corresponding aqueous inkjet ink of the same colour, but at a much lower concentration. The aqueous inkjet ink set preferably contains one or more aqueous light inkjet inks containing a pigment in an amount of 0.1 to 1.2 wt % of a pigment, wherein the weight percentage (wt %) is based on the total weight of the aqueous light inkjet ink.

However, adding light inkjet inks for each colour cyan, red, yellow and black comes at a substantial economical cost, especially for single pass inkjet printing, and also increases the complexity of the inkjet printer. It was found that the best compromise between improved graininess and economical cost was achieved by adding to the CRYK inkjet ink set only an aqueous light black inkjet ink having a very low amount of black pigment. Such an aqueous light black inkjet ink preferably contains 0.1 to 0.6 wt %, more preferably 0.2 to 0.3 wt % of carbon black pigment, wherein the weight percentage (wt %) is based on the total weight of the aqueous light black inkjet ink.

The static surface tension of the aqueous inkjet ink is preferably in the range of 18 mN/m to 40 mN/m at 25° C., more preferably in the range of about 19 mN/m to about 35 mN/m at 25° C. In these ranges, the ink spreading is optimal for obtaining good image quality on, for example, décor paper used to manufacture decorative panels.

Polymeric Dispersants

The aqueous pigmented inkjet inks preferably contain a polymeric dispersant for dispersing the pigment. One or more aqueous inkjet inks may also contain a dispersion synergist to further improve the dispersion quality and stability of the ink.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable commercial dispersants are DISPERBYK™ dispersants available from BYK CHEMIE, JONCRYL™ dispersants available from JOHNSON POLYMERS and SOLSPERSET™ dispersants available from ZENECA. A detailed list of non-polymeric as well as some polymeric dispersants is disclosed by MC CUTCHEON. Functional Materials, North American Edition. Glen Rock,N.J.: Manufacturing Confectioner Publishing Co., 1990. p. 110-129.

The polymeric dispersant has preferably a number average molecular weight Mn between 500 and 30000, more preferably between 1500 and 10000, in order to obtain good jetting performance.

The polymeric dispersant has preferably a weight average molecular weight Mw smaller than 100,000, more preferably smaller than 50,000 and most preferably smaller than 30,000, in order to obtain good jetting performance.

In a particularly preferred embodiment, the polymeric dispersant used in the cyan, red and black aqueous inkjet inks is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl (meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MUNZING.

Organic Solvents

Suitable organic solvents include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols. Preferred organic solvents are glycerol and 1,2-hexanediol, the latter two were found to be the most effective for improving latency.

For regulating the viscosity of the aqueous inkjet ink, preferably a polyalkyleneglycol dialkylether represented by Formula (A) is used in the aqueous dispersion medium:

Formula (A)

wherein, $R_1$ and $R_2$ are each independently selected from an alkyl group having 1 to 4 carbon atoms; Y represents an ethylene group or a propylene group; and n is an integer selected from 5 to 20. The alkyl groups $R_1$ and $R_2$ of the polyalkyleneglycol dialkylethers according to Formula (A) preferably represent methyl and/or ethyl. Most preferably, the alkyl groups $R_1$ and $R_2$ are both methyl groups.

In a preferred embodiment the polyalkyleneglycol dialkylethers according to Formula (A) are polyethyleneglycol dialkylethers, preferably polyethyleneglycol dimethylethers, as they mix very easily with water to provide an aqueous pigment dispersion.

Instead of pure compounds also a mixture of polyalkyleneglycol dialkylethers may be used. Suitable mixtures of polyalkyleneglycol dialkylethers include mixtures of polyethylene glycol dimethyl ethers having an average molecular weight of at least 200, such as Polyglycol DME 200™, Polyglycol DME 250™ and Polyglycol DME 500™ from CLARIANT. The polyalkyleneglycol dialkylethers used in the aqueous inkjet ink have preferably an average molecular weight between 200 and 800.

Other preferred organic solvents having good water solubility include ethylene glycol, propylene glycol, diethylene glycol, triethylene glycol, dipropylene glycol, 1,3-propanediol, 1,2-butanediol, 2,3-butanediol, 1,3-butanediol, 1,2,3-trihydroxypropane (glycerol), 1,4-butanediol, 2,2-dimethyl-1, 3-propanediol, 2-methyl-1, 3-propanediol, 1,2-pentanediol, 2,4-pentanediol, 2-methyl-2, 4-pentanediol, 1,5-pentanediol, 1,6-hexanediol, 2-ethyl-1, 3-hexanediol, 1,2-hexanediol and 2,5-hexanediol, dipropylene glycol monomethyl ether, dipropylene glycol n-propyl ether, tripropylene glycol methyl ether, tripropylene glycol n-propyl ether, propylene glycol phenyl ether, propylene glycol n-butyl ether, propylene glycol t-butyl ether, diethylene glycol methyl ether, ethylene glycol n-propyl ether, triethylene glycol methyl ether, triethylene glycol ethyl ether, diethylene glycol n-hexyl ether and ethylene glycol phenyl ether, 2-pyrrolidone, N-methylpyrrolidone, N-ethylpyrolidone, 2,5,7,10-tetraoxaundecane (TOU), 1,3-dioxolane, 1-(2-Butoxy-1-methylethoxy)-2-propanol (solvenol DPnB) or 1(or 2)-(2-Butoxymethylethoxy)propanol (Dowanol DPnB), butyldiglycol, N,N-dimethyl lactamide, 3-methoxy N,N-dimethylpropionamide, 3-methoxy-3-methyl-1-butanol (MMB) and alpha-methyl-gamma-butyrolactone (MBL).

Surfactants

The aqueous inkjet inks preferably contain at least one surfactant. The surfactant(s) can be anionic, cationic, non-ionic, or zwitter-ionic and are usually added in a total quantity of less than 1.0 wt % based on the total weight of the inkjet ink and particularly in a total quantity less than 0.3 wt % based on the total weight of the inkjet ink. The total quantity above is expressed as dry solids.

Suitable surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluorine-based surfactants, such as fluorinated hydrocarbons.

Suitable examples of anionic fluorosurfactant include Capstone™ FS-63, Capstone™ FS-61 (manufactured by DU PONT), Ftergent™ 100, Ftergent™ 110, and Ftergent™ 150 (manufactured by Neos Co. Ltd.); and Chemguard™ S-760P (manufactured by Chemguard, Inc.).

A particularly preferred commercial fluorosurfactant is Capstone™ FS3100 from DU PONT.

In a preferred embodiment of the aqueous inkjet ink, the surfactant is a fluorosurfactant, more preferably an alkoxylated fluorosurfactant, and most preferably an alkoxylated fluorosurfactant containing a sulfonic acid group or a salt thereof.

Biocides

Suitable biocides for the aqueous inkjet inks used in the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL, Proxel™ K and Proxel™ Ultra 5 available from ARCH UK BIOCIDES and Bronidox™ available from COGNIS.

A particularly preferred biocide is a 1,2-benzisothiazolin-3-one based biocide.

A biocide is preferably added in an amount of 0.001 to 3.0 wt %, more preferably 0.01 to 1.0 wt %, each based on the total weight of the aqueous inkjet ink.

pH-Adjusters

It is preferable that the pigmented inkjet ink has a pH of 7.5 or higher at 25° C., from the viewpoint of dispersion stability.

The aqueous inkjet ink may contain at least one pH adjuster. Suitable pH adjusters include NaOH, KOH, NEt$_3$, NH$_3$, HCl, HNO$_3$, H$_2$SO$_4$ and (poly)alkanolamines such as triethanol amine and 2-amino-2-methyl-1-propanol.

Preferred pH adjusters are triethanol amine, NaOH and $H_2SO_4$.

The pH is preferably adjusted to a value between 7.5 and 10.0, more preferably between 8.0 and 9.0; the latter pH range has been observed to result in improved ink stability and optimal compatibility with the piezoelectric inkjet print heads.

Other Additives

The ink may include other additives as necessary, in addition to the components described above.

Examples of the other components include known additives such as a discoloration inhibitor, an emulsion stabilizer, a penetration enhancer, an ultraviolet absorber, an antiseptic agent, an antifungal agent, a viscosity adjusting agent, a rust inhibitor, and a chelating agent.

Preferred UV absorbers include benzophenone compounds, benzotriazole compounds, salicylic acid ester compounds, and hydroxyphenyltriazine.

Manufacturing Methods of Inkjet Inks

The pigmented aqueous inkjet inks may be prepared by precipitating or milling the colour pigment in a dispersion medium in the presence of the polymeric dispersant, or simply by mixing a self-dispersible colour pigment in the ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind may vary depending upon the specific pigments. The contents of the milling mixture comprise the mill grind and the milling media. The mill grind comprises pigment, dispersant and a liquid carrier, preferably water. For aqueous ink-jet inks, the pigment is usually present at 10 to 30 wt % in the mill grind, excluding the milling media. The weight ratio of pigment over dispersant is preferably 20:1 to 1:2.

The milling time can vary widely and depends upon the pigment, selected mechanical means and residence conditions, the initial and desired final particle size, etc. In the present invention pigment dispersions with an average particle size of less than 150 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application. Viscosity can also be adjusted by using low molecular weight polyethylene glycols, for example having an average numerical molecular weight between 200 and 800. An example is PEG 200 from CLARIANT.

INDUSTRIAL APPLICABILITY

The inkjet printing methods described above can be used in many applications, but can be advantageously exploited in manufacturing methods of decorative panels and printed corrugated board.

Manufacturing Methods of Decorative Panels

A preferred method of manufacturing decorative panels comprises the steps of:
 a) printing décor paper with the grayscale inkjet printing method as described above;
 b) impregnating the printed décor paper with a thermosetting resin;
 c) heat pressing the thermosetting resin impregnated printed décor paper into a decorative laminate; and
 d) cutting the decorative laminate into decorative panels selected from the group consisting of flooring, kitchen, furniture and wall panels.

The thermosetting resin impregnated printed décor paper is preferably heat pressed between a core layer and a protective layer and cut into a decorative panel selected from the group consisting of flooring, kitchen, furniture and wall panels. The thermosetting resin used is preferably a melamine based resin.

The décor paper preferably includes multiple ink receiving layers with an outermost ink receiving layer containing no inorganic pigment or an amount of inorganic pigment smaller than that of one or more ink receiving layers located between the paper substrate and the outermost ink receiving layer. The advantage is that the printing reliability is enhanced. For fast drying, the ink receiving layers contain high amounts of inorganic pigments, such as fumed silica, which can create dust problems due to the transporting of the paper substrate in the inkjet printer, especially in a single pass inkjet printing pass where very high speeds for transporting the paper substrate below the print heads are used. This dust problem is reduced by having an outermost ink receiving layer containing no or only a small amount of inorganic pigments.

The one or more ink receiving layers preferably include an inorganic pigment selected from the group consisting of alumina hydrates, aluminum oxides, aluminum hydroxides, aluminum silicates, and silica's. The one or more ink receiving layers contain a polymeric binder preferably selected from the group consisting of polyvinylalcohol, a vinylalcohol copolymer or modified polyvinyl alcohol. Preferably, the one or more ink receiving layers contain a crushing agent selected from the group consisting of a cationic polymeric binder, a cationic inorganic pigment and multivalent salts.

In one embodiment, the paper substrate is a coloured paper substrate, more preferably a bulk coloured paper substrate. The use of a coloured paper substrate reduces the amount of inkjet ink required to form the colour image.

It was observed that improved image quality is obtained when the inkjet printing is performed in a manner that the wood nerves in the colour image are extending in a direction substantially corresponding to the inkjet printing direction. For a single pass inkjet printing process, the inkjet printing direction is the transport direction of the paper substrate. In a multi-pass inkjet printing process, the inkjet printing direction is the scanning direction of the print heads.

In a preferred embodiment, the grayscale inkjet printing method is used to manufacture decorative panels including a tongue and a groove capable of achieving a glue less mechanical join between decorative panels.

The grayscale inkjet printing method is preferably part of a DPL process, wherein the decorative layer is taken up in a stack to be pressed with a core layer and a protective layer, and preferably also a balancing layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

In a preferred embodiment, a protective layer containing a thermosetting resin impregnated paper is applied onto the inkjet printed colour image. The thermosetting resin may be a colored thermosetting resin to reduce the amount of inkjet ink to be printed.

Manufacturing Method of Printed Corrugated Cardboard

A preferred manufacturing method of printed corrugated cardboard comprises the steps of
a) providing a paper liner board with an ink receiving layer; and
b) inkjet printing an image onto the ink receiving layer with the grayscale inkjet printing method as described above.

In a preferred embodiment of the manufacturing method, the inkjet printing is performed according to a single pass printing process. Single pass inkjet machines run at very high speeds, some even up to 150 m/min. For example, the clogging of one or more nozzles by inkjet ink results in line artefacts in the printed image, waste of materials and interruptions of the printing process. This represents not only a financial loss, but also a loss in productivity. By using the grayscale inkjet printing method as described above, this loss in productivity can be avoided, while providing an improved image quality.

Although inkjet printing may be performed directly on a corrugated cardboard having one or more ink-receiving layers, the manufacturing method preferably includes a step c) of laminating the inkjet printed paper linerboard onto a fluted paperboard of a corrugated cardboard. The latter is advantageous for image quality.

The manufacturing method preferably also includes a step of applying a protective varnish layer on the inkjet printed image. Such a protective varnish layer generally also increases the glossiness of the inkjet printed image, which is beneficial for the image quality.

In a particularly preferred embodiment of the manufacturing method, an ink receiving layer and/or a protective varnish layer are applied by flexographic printing. This is beneficial for productivity. The ink receiving layer and protective varnish layer can also be applied by coating, e.g. using a bar-coater or a knife coater. However, coating methods generally create more waste as it takes some time to reach a stable coating state of good quality. Flexographic printing has the advantage that the flexographic printing rolls can be easily incorporated in the inkjet printing system and operated at the same printing speed.

The preferred corrugated cardboard in the present invention is single wall or double wall, more preferably single wall corrugated cardboard as this is sufficiently strong and easy to crease. Single face corrugated cardboard generally has insufficient strength to hold the merchandise articles, while triple wall cardboard is often more difficult to crease into a packaging box.

The paper board used in corrugated cardboard, such as Kraft paper, has usually a brownish colour. In a preferred embodiment of the manufacturing method described above, the paper liner board has a white colour. By having a white background, an enhanced image quality is obtained. Inkjet printed colours on the white paper liner board have a much higher vibrancy then when printed on brownish Kraft paper linerboard. The white colour background also contributes to the customer experience as the customer regards this as a more luxurious product. Alternatively, the white background may be applied as a layer by coating or printing prior to inkjet printing. However, a white paper liner board is preferred, as this enhances reliability of the printing process by eliminating possible problems that may occur during coating or printing the white layer. Suitable paper liner board having a white background include white top kraftliner and white coated kraftliner.

EXAMPLES

Materials

All materials used in the following examples were readily available from standard sources such as Aldrich Chemical Co. (Belgium) and Acros (Belgium) unless otherwise specified. Where used, water is demineralised water.

PR254 is the abbreviation for C.I. Pigment Red 254 for which Irgazin™ DPP Red BTR from BASF was used.

PB15:3 is an abbreviation used for Sunfast™ Blue 15:3, a C.I. Pigment Blue 15:3 pigment from SUN CHEMICAL.

Edaplan is an abbreviation used for Edaplan™ 482, a polymeric dispersant from MUNZING.

PEG 200 is a polyethylene glycol having an average molecular weight of 200 from CLARIANT.

Proxel is an abbreviation used for a 5% aqueous solution of 1,2-benzisothiazolin-3-one available as Proxel™ K from YDS CHEMICALS NV.

TEA is triethanol amine.

Surfynol™ 104H is a 74% solution of (2,4,7,9-tetramethyl-5-decyne4,7-diol) in ethylene glycol.

Measurement Methods

1. Viscosity

The viscosity of an inkjet ink was measured, using a Brookfield DV-II+ viscometer at a certain temperature and at a shear rate of $1,000 \text{ s}^{-1}$.

2. Outer Nozzle Surface Area

The dimensions of a nozzle aperture on the nozzle plate of a print head were determined using a SMZ1500 stereo microscope from NIKON at a zoom ratio of 11.25×. An average from the dimensions determined for ten nozzles was taken. The nozzle dimensions determined are those necessary to calculate the outer nozzle surface area. For example, the nozzle diameter was determined for a circular nozzle, while for a rectangular nozzle both the length and the width were measured.

3. Jetting Performance

The jetting performance was analysed with a JetXpert™ dropwatcher from IMAGEXPERT equipped with a Samba™ G3L HF through-flow grayscale print head having an ARP of 4.36 µs.

The "drop volume", expressed in pL (picoliter), and the "drop velocity", expressed in m/s, are measured using the Default Drops Analysis Method of the JetXpert™ dropwatcher. The measurements are performed on ink droplets at a distance between 0.9 and 1.1 mm from the nozzle plate. For good image quality, the differences in drop velocity between smaller and larger droplets should be less than 1.0 m/s.

The "satellite distance" is determined by taking multiple photographs of the ejection of ink droplets and transferring them to a PC on which software is available to measure distances on the photographic images. For the sake of clarity, the measurements are also performed on ink droplets at a distance between 0.9 and 1.1 mm from the nozzle plate. For all visible drops of the same jetting cycle, the maximum distance of the centre of the main drop to the centre of any satellite of that drop is determined. The average maximum distance is calculated for all satellites of all visible drops of the same jetting cycle. This maximum distance, called "satellite distance" is expressed in μm. A value of 0 μm means that no satellites were observed. The larger the value of the satellite distance, the larger also the distance will be on the substrate between the landing of the ink droplet and the satellite, thereby deteriorating the image quality. For acceptable image quality, the satellite distance should be smaller than 150 μm. Excellent image quality is achieved if the satellite distance is smaller than 70 μm or if more preferably no satellites (satellite distance of 0 μm) are observed.

Pooling is the building up of a thin ink layer on the nozzle plate which can reduce the drop speed. When the ink layer becomes thicker, the drop speed becomes too low and nozzles can drop out. The susceptibility to pooling can be predicted by performing a frequency sweep from 1 kHz to 41 kHz and measuring the drop velocity at each frequency increase of 1 kHz. In order to minimize the effect of pooling, the maximum difference in drop velocity in the range of 1 kHz to 41 kHz should be smaller than 1.5 m/s.

4. Acoustic Resonance Period (ARP)

Figure 5:
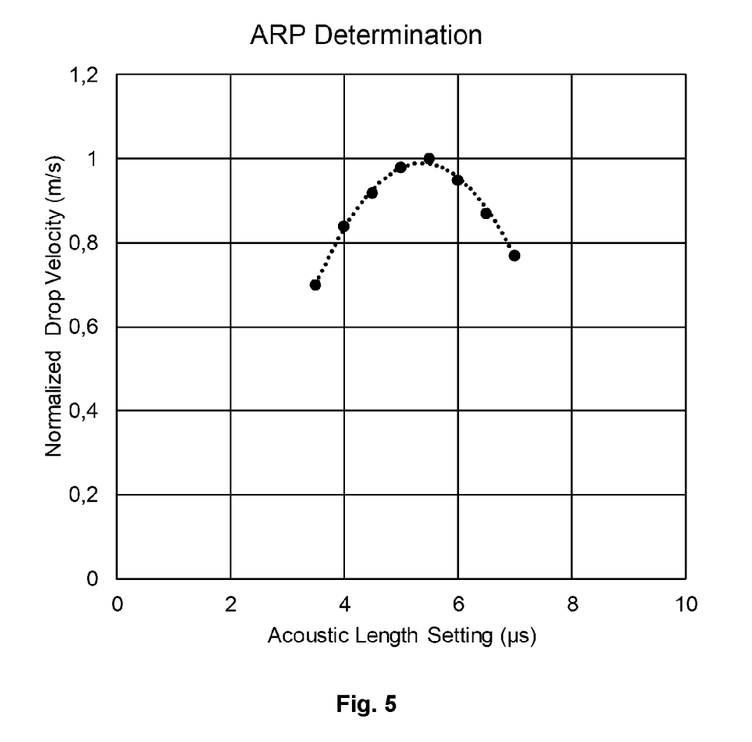
FIG. 5 is a graph plotting the normalized drop velocity (m/s) as a function of the acoustic length setting (µs) where the maximum of the curve is the acoustic resonance period (ARP).

Piezo ink jet print heads work with acoustic pressure pulses that are brought into resonance. The acoustic resonance period is determined by using a single pulse wave form and gradually increasing the wait time between two subsequent and opposite piezo movements. For each setting, the drop velocity is measured. The normalized drop velocity is calculated for each drop velocity by dividing it by the maximum drop velocity measured. A graph is produced as shown in FIG. 5 by drawing the smoothest curve through the data points of the normalized drop velocity. The ARP is determined from the maximum of the curve.

5. Average Particle Diameter (APD)

A dispersion sample is diluted with demineralized water to a pigment concentration of 0.002 wt %. The average particle size of pigment particles is determined with a Nicomp™ 380 Particle Sizing System based upon the principle of dynamic light scattering using a laser having an emission wavelength of 633 nm and measured under a scattering angle of 90 degrees.

Example 1

This example illustrates the influence of aqueous pigmented inkjet inks and the pulses in a wave form on the jetting performance.

Preparation Concentrated Pigment Dispersion CPR

The concentrated aqueous pigment dispersion was prepared made by mixing a composition according Table 1 to for 30 minutes with a Disperlux™ mixer.

TABLE 1

| wt % of component | CPR |
| --- | --- |
| PR254 | 25.00 |
| Edaplan | 12.50 |
| Proxel | 0.02 |
| 1,2 hexanediol | 1.00 |
| Water | 61.48 |

The concentrated aqueous pigment dispersion was then milled using a Dynomill™ KDL with 0.4 mm yttrium stabilized zirconium beads YTZ™ Grinding Media (available from TOSOH Corp.). The mill was filled to half its volume with the grinding beads and the dispersion was milled for 3 hours at flow rate of 200 mL/min and a rotation speed of 15 m/s. After milling, the dispersion is separated from the beads. The resulting concentrated aqueous pigment dispersion CPR served as the basis for the preparation of the inkjet inks Ink-A and Ink-B. The average particle diameter APD was 139 μm.

Preparation Concentrated Pigment Dispersion CPC

The concentrated aqueous pigment dispersion was prepared made by mixing a composition according to Table 2 for 30 minutes with a Disperlux™ mixer.

TABLE 2

| wt % of component | CPR |
| --- | --- |
| PB15:3 | 15.00 |
| Edaplan | 7.50 |
| Proxel | 0.02 |
| 1,2 hexanediol | 1.00 |
| Water | 76.48 |

The concentrated aqueous pigment dispersion was then milled using a Dynomill™ KDL with 0.4 mm yttrium stabilized zirconium beads YTZ™ Grinding Media (available from TOSOH Corp.). The mill was filled to half its volume with the grinding beads and the dispersion was milled for 3 hours at flow rate of 200 mL/min and a rotation speed of 15 m/s. After milling, the dispersion is separated from the beads. The resulting concentrated aqueous pigment dispersion CPC served as the basis for the preparation of the inkjet ink Ink-C. The average particle diameter APD was 149 μm.

Preparation Inkjet Inks

Using the concentrated pigment dispersions CPR and CPC, the aqueous inkjet inks Ink-A to Ink-C were prepared in order to obtain an ink composition according to Table 3 having a different amount in water and viscosity.

TABLE 3

| wt % of component: | Ink-A | Ink-B | Ink-C |
| --- | --- | --- | --- |
| PR254 | 2.70 | 2.70 | — |
| PB15:3 | — | — | 2.20 |
| Edaplan | 1.58 | 1.58 | 1.10 |
| 1,2-hexanediol | 3.00 | 3.00 | 3.00 |
| Glycerol | 20.00 | 20.00 | 10.00 |
| PEG200 | 13.50 | 20.00 | — |
| PG | — | — | 32.50 |
| Proxel K | 0.25 | 0.25 | — |
| Surfynol ™ 104H | — | — | 0.27 |
| TEA | 0.30 | 0.30 | 0.30 |
| Water | 58.67 | 52.17 | 50.63 |
| Viscosity at 32° C. | 3.5 mPa·s | 4.5 mPa·s | 4.5 mPa·s |
| Viscosity at 25° C. | 4.0 mPa·s | 6.0 mPa·s | 6.0 mPa·s |

Evaluation and Results

Figure 3:
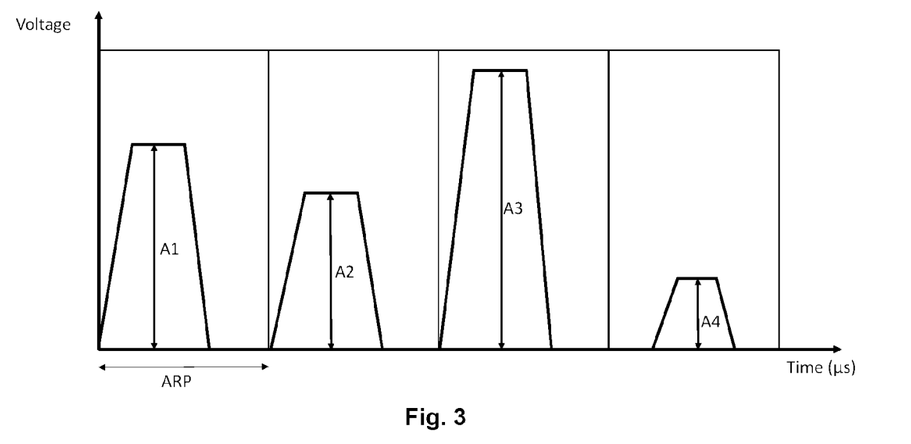
FIG. 3 shows a wave form encompassing four acoustic resonance periods (ARP), each ARP including a pulse having an amplitude A1, A2, A3 or A4.
Figure 4:
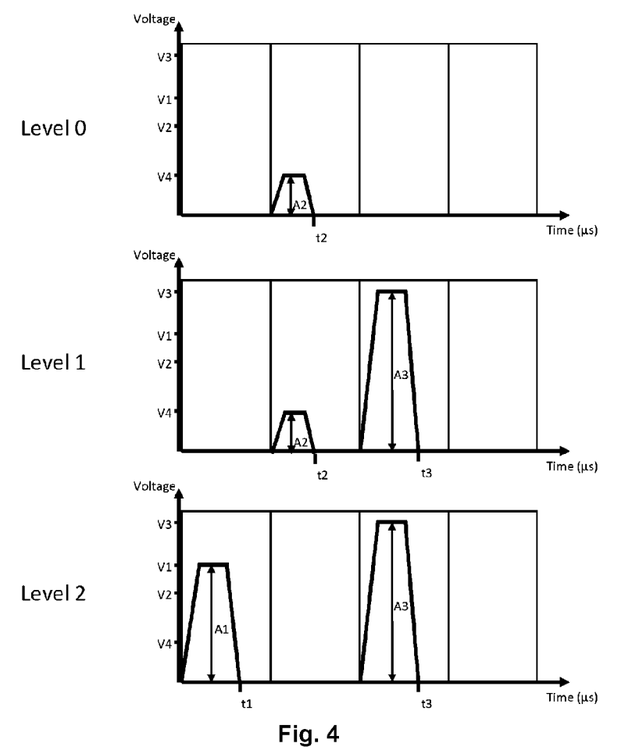
FIG. 4 shows how three grayscale levels (Level 0, 1 and 2) are obtained by selectively activating different pulses of the wave form. No ink droplet is ejected at level 0, while at level 1 a smaller ink droplet is produced than at level 2.

The measurements on the jetting performance were performed on a JetXpert from IMAGEXPERT using a Samba™ G3L HF print head from FUJIFILM for different wave forms according to FIG. 3. The ARP is 4.4 µs. The outer nozzle surface area NS of the print head was determined with a microscope and found to be 240 µm².

The jetting performance was then evaluated for different voltage wave forms as defined with reference to FIG. 3, which is showing 4 acoustic resonance periods containing pulses with amplitudes A1 to A4. Here below, the amplitudes are referred to as a percentage of the amplitude A3, the latter being indicated as 100. For each pulse, the slope of the rising time is 49.0 V/µs and the slope of the falling time is −49.0 V/µs. Each pulse started at the beginning of an acoustic resonance period and the duration of rising time and dwell time was in all cases 2.2 µs.

Several wave forms were designed to illustrate the invention.

A wave form COMP-1 employed three pulses with amplitudes A1 to A3 according to Table 4. Selectively activating different pulses of the wave form COMP-1 allowed to generate four grayscale levels, while a jetting cycle was possible to achieve a jetting frequency of more than 60 kHz. However, no stable jetting was found to be possible with an inkjet ink jetted at 32° C. with a viscosity of 3.5 mPa·s. Especially, at Level 3 many satellites were observed. It was assumed that the pressure in the ink chamber was not yet damped to zero when the next jetting cycle was commenced.

TABLE 4

| COMP-1 waveform | | | |
|---|---|---|---|
| Grayscale level | A1 | A2 | A3 |
| Level 0 | | | |
| Level 1 | | | 100 |
| Level 2 | 68 | | 100 |
| Level 3 | 68 | 50 | 100 |

The wave form COMP-2 was essentially the same as the wave form COMP-1, except that a non-ejecting pulse with amplitude A4 was added to function as a cancellation pulse. Such a cancellation pulse is well-known measure to improve jetting performance, when a lot of satellites are observed. Again four grayscale levels could be generated, while stable jetting was found to be possible. However, by the addition of the cancellation pulse, a jetting frequency of more than 60 kHz was no longer possible.

TABLE 5

| COMP-2 wave form | | | | |
|---|---|---|---|---|
| Grayscale level | A1 | A2 | A3 | A4 |
| Level 0 | | | | 20 |
| Level 1 | | | 100 | 20 |
| Level 2 | 68 | | 100 | 20 |
| Level 3 | 68 | 50 | 100 | 20 |

The wave form COMP-3 is an optimization for jetting performance of wave form COMP-2. A jetting frequency of more than 60 kHz was not possible.

TABLE 6

| COMP-3 wave form | | | | |
|---|---|---|---|---|
| Grayscale level | A1 | A2 | A3 | A4 |
| Level 0 | | | | 20 |
| Level 1 | | | 100 | 20 |
| Level 2 | 59 | | 100 | 20 |
| Level 3 | 59 | 39 | 100 | 20 |

The wave form INV-1 is a wave form in accordance with the invention, wherein three pulses are employed with amplitudes A1 to A3. Selectively activating different pulses of the wave form INV-1 according to Table 7 generated three grayscale levels. Stable inkjet printing at a jetting frequency of 60 kHz and more was possible using a jetting cycle of three ARPs.

TABLE 7

| INV-1 waveform | | | |
|---|---|---|---|
| Grayscale level | A1 | A2 | A3 |
| Level 0 | | | |
| Level 1 | | 28 | 100 |
| Level 2 | 80 | | 100 |

The wave form INV-2 is essentially the same as the wave form INV-1, except that a smaller amplitude A2 was used for the tickle pulse, which was also included for grayscale level 0. A frequency of more than 60 kHz was again possible.

TABLE 8

| INV-2 wave form | | | |
|---|---|---|---|
| Grayscale level | A1 | A2 | A3 |
| Level 0 | | 20 | |
| Level 1 | | 20 | 100 |
| Level 2 | 80 | | 100 |

The jetting performance was determined for the wave forms COMP-2, COMP-3, INV-1 and INV-2 in combination with the aqueous pigmented inkjet inks Ink-A, Ink-B and Ink-C. The results of comparative examples C-1 to C-9 and inventive examples I-1 to I-9 are shown in Table 9. For some of the examples, such as C-5 to C-7, not all measurements were performed, as the listed gray levels already demonstrated poor jetting performance. The abbreviations used in Table 9 are: 'V' is the drop velocity of the main drop at a certain gray level; "SD" is the satellite distance and "ΔV" is difference in drop velocity between the largest ink droplet (Level 2 or 3) and the smallest ink droplet (Level 1), satellites excluded. The "Drop Volume Ratio" is the ratio of the drop volume of the largest ink droplet (Level 2 or 3) over the drop volume of the smallest ink droplet (Level 1)

TABLE 9

| Example | Wave form | Level | Ink | Jetting Temp | Jetting Visco mPa·s | Drop Volume pL | Drop Volume Ratio | V m/s | SD μm | ΔV m/s | Pooling m/s |
|---|---|---|---|---|---|---|---|---|---|---|---|
| C-1 | COMP-2 | 0 | A | 32° C. | 3.5 | — | 2.2 | — | — | 2.5 | 1.6 |
|  |  | 1 |  |  |  | 2.1 |  | 4.2 | 0 |  |  |
|  |  | 2 |  |  |  | 3.4 |  | 5.0 | 200 |  |  |
|  |  | 3 |  |  |  | 4.6 |  | 6.7 | 219 |  |  |
| C-2 | COMP-3 | 0 | A | 25° C. | 4.0 | — | 1.9 | — | — | 0.8 | 1.5 |
|  |  | 1 |  |  |  | 2.3 |  | 5.9 | 0 |  |  |
|  |  | 2 |  |  |  | 3.2 |  | 6.4 | 159 |  |  |
|  |  | 3 |  |  |  | 4.4 |  | 6.7 | 260 |  |  |
| C-3 | INV-1 | 0 | A | 32° C. | 3.5 | — | 2.3 | — | — | 0.6 | 1.9 |
|  |  | 1 |  |  |  | 2.2 |  | 6.0 | 0 |  |  |
|  |  | 2 |  |  |  | 5.0 |  | 6.6 | 51 |  |  |
| C-4 | INV-2 | 0 | A | 32° C. | 3.5 | — | 2.3 | — | — | 1.3 | 2.3 |
|  |  | 1 |  |  |  | 2.1 |  | 5.5 | 0 |  |  |
|  |  | 2 |  |  |  | 4.8 |  | 6.8 | 50 |  |  |
| I-1 | INV-1 | 0 | A | 25° C. | 4.0 | — | 1.7 | — | — | 0.1 | 1.1 |
|  |  | 1 |  |  |  | 2.7 |  | 6.7 | 0 |  |  |
|  |  | 2 |  |  |  | 4.7 |  | 6.8 | 0 |  |  |
| I-2 | INV-2 | 0 | A | 25° C. | 4.0 | — | 1.9 | — | — | 0.6 | 1.0 |
|  |  | 1 |  |  |  | 2.5 |  | 6.0 | 0 |  |  |
|  |  | 2 |  |  |  | 4.8 |  | 6.6 | 0 |  |  |
| C-5 | COMP-2 | 0 | B | 32° C. | 4.5 | — | 1.9 | — | — | 1.7 | 1.7 |
|  |  | 1 |  |  |  | 2.3 |  | 5.1 | 0 |  |  |
|  |  | 3 |  |  |  | 4.4 |  | 6.8 | 323 |  |  |
| C-6 | COMP-2 | 0 | B | 25° C. | 6.0 | — | 1.8 | — | — | 0.5 | 0.2 |
|  |  | 1 |  |  |  | 2.7 |  | 6.2 | 0 |  |  |
|  |  | 3 |  |  |  | 4.8 |  | 6.7 | 318 |  |  |
| I-3 | INV-1 | 0 | B | 32° C. | 4.5 | — | 1.9 | — | — | 0.1 | 0.7 |
|  |  | 1 |  |  |  | 2.7 |  | 6.7 | 0 |  |  |
|  |  | 2 |  |  |  | 5.0 |  | 6.8 | 0 |  |  |
| I-4 | INV-2 | 0 | B | 32° C. | 4.5 | — | 1.8 | — | — | 0.5 | 0.9 |
|  |  | 1 |  |  |  | 2.6 |  | 6.2 | 0 |  |  |
|  |  | 2 |  |  |  | 4.7 |  | 6.7 | 0 |  |  |
| I-5 | INV-2 | 0 | B | 25° C. | 6.0 | — | 1.8 | — | — | 0.3 | 0.2 |
|  |  | 1 |  |  |  | 2.6 |  | 6.4 | 0 |  |  |
|  |  | 2 |  |  |  | 4.8 |  | 6.7 | 0 |  |  |
| C-7 | COMP-2 | 3 | C | 32° C. | 4.5 | 4.7 | — | 6.6 | 235 | — | 0.9 |
| C-8 | COMP-3 | 0 | C | 32° C. | 4.5 | — | 2.0 | — | — | 1.1 | 1.0 |
|  |  | 1 |  |  |  | 2.3 |  | 5.6 | 0 |  |  |
|  |  | 2 |  |  |  | 3.2 |  | 6.5 | 237 |  |  |
|  |  | 3 |  |  |  | 4.7 |  | 6.7 | 295 |  |  |
| I-6 | INV-1 | 0 | C | 32° C. | 4.5 | — | 1.9 | — | — | 0.2 | 1.0 |
|  |  | 1 |  |  |  | 2.5 |  | 6.5 | 0 |  |  |
|  |  | 2 |  |  |  | 4.7 |  | 6.7 | 0 |  |  |
| I-7 | INV-2 | 0 | C | 32° C. | 4.5 | — | 1.9 | — | — | 0.8 | 0.0 |
|  |  | 1 |  |  |  | 2.4 |  | 6.0 | 0 |  |  |
|  |  | 2 |  |  |  | 4.6 |  | 6.8 | 0 |  |  |
| C-9 | COMP-3 | 0 | C | 25° C. | 6.0 | — | 1.9 | — | — | 0.3 | 0.2 |
|  |  | 1 |  |  |  | 2.7 |  | 6.3 | 0 |  |  |
|  |  | 2 |  |  |  | 3.6 |  | 6.9 | 202 |  |  |
|  |  | 3 |  |  |  | 5.2 |  | 6.6 | 294 |  |  |
| I-8 | INV-1 | 0 | C | 25° C. | 6.0 | — | 1.8 | — | — | −0.4 | 0.2 |
|  |  | 1 |  |  |  | 2.8 |  | 7.0 | 0 |  |  |
|  |  | 2 |  |  |  | 4.9 |  | 6.6 | 0 |  |  |
| 1I-9 | INV-2 | 0 | C | 25° C. | 6.0 | — | 1.8 | — | — | 0.4 | 0.1 |
|  |  | 1 |  |  |  | 2.6 |  | 6.1 | 0 |  |  |
|  |  | 2 |  |  |  | 4.7 |  | 6.5 | 0 |  |  |

It is immediately clear that good jetting performance was only observed for the inventive examples I-1 to I-9, which exhibited no satellites for a large drop volume at Level 2 and at a drop velocity above 6 m/s, thus reaching the desired drop volume ratio wherein the volume of the large droplet is about 1.6 to 2.4 times larger than the volume of the small droplet. The latter allows for printing an excellent image quality in a productive manner, which is not the case for the comparative examples C-1 to C-9.

Example 2

This example illustrates the influence on the jetting performance of adaptations to the amplitudes AP1 to AP3 of a Level 2 in a voltage wave form.

EVALUATION AND RESULTS

The pigmented inkjet ink Ink-A of EXAMPLE 1 was used for evaluating the jetting performance at a jetting temperature of 25° C., whereat the pigmented inkjet ink Ink-A has a viscosity of 4.0 mPa·s. The examples I-10 to I-13 are in accordance with the invention. In the comparative examples C-10 to C-14, the amplitudes A1, A2 and A3 were adapted to values not in accordance with the invention as shown in Table 10.

The droplet velocity (V), the satellite distance (SD) and pooling were determined (n.m.=not measured).

TABLE 10

| Example | Wave form | | | V (m/s) | SD μm | Pooling (m/s) |
|---|---|---|---|---|---|---|
| | A1 | A2 | A3 | | | |
| I-10 | 59 | 0 | 100 | 6.6 | 115 | 1.2 |
| I-11 | 80 | 0 | 100 | 6.8 | 0 | 1.1 |
| I-12 | 100 | 0 | 100 | 6.8 | 77 | 0.8 |
| I-13 | 127 | 0 | 100 | 6.6 | 134 | 1.3 |
| C-10 | 145 | 0 | 100 | 6.6 | 173 | 1.1 |
| C-11 | 167 | 0 | 100 | 6.8 | 249 | 1.1 |
| C-12 | 59 | 20 | 100 | 6.6 | 302 | 1.6 |
| C-13 | 145 | 29 | 100 | 6.7 | 323 | 0.7 |
| C-14 | 100 | 69 | 0 | 6.8 | 347 | 1.4 |

From the results in Table 10, it can be seen that a modification of the voltage wave form for the values of the amplitudes A1 to A3 outside the ranges of the invention (see C-10 to C-14) results in unacceptable satellites. By comparing the inventive examples I-10 to I-13, it is clear that the satellite distance is minimized (see I-11) when complying with the relationship $0.65 \times A3 < A1 < 0.90 \times A3$, resulting in a further improved image quality.

REFERENCE SIGNS LIST

TABLE 11

| | |
|---|---|
| 1 | Pulse |
| 2 | Rising time |
| 3 | Dwell time |
| 4 | Falling time |
| 5 | Amplitude |
| 6 | End time |
| 10 | Module |
| 11 | Actuator |
| 12 | Module body |
| 13 | Nozzle plate |
| 14 | Outer nozzle aperture |
| 15 | Ink chamber |
| 16 | Ink supply path |
| 17 | Piezoelectric layer |
| 18 | Ground electrode |
| 19 | Drive electrode |
| 20 | Impedance feature |

The invention claimed is:

1. A grayscale inkjet printing method including the steps of:
   a) supplying a pigmented inkjet ink to a grayscale print head having nozzles with an outer nozzle surface area smaller than 500 μm² and having an acoustic resonance period (ARP) of not more than 5.5 μs; and
   b) applying a voltage wave form for ejecting pigmented inkjet ink from a nozzle of the grayscale print head within one jetting cycle;
   wherein the pigmented inkjet ink has a viscosity of at least 3.8 mPa·s at jetting temperature and a shear rate of 1,000 s⁻¹;
   wherein the voltage wave form for ejecting the largest ink droplet includes, in chronological order, a first ejecting pulse having an amplitude A1 and a second ejecting pulse having an amplitude A3 with the amplitude A1 complying with the relationship:

$$0.50 \times A3 < A1 < 1.40 \times A3; \text{ and}$$

wherein a time period between the end time of the first ejecting pulse and the end time of the second ejecting pulse defines an idle time period including no other ejecting pulse, the time period having a duration between 1.5 to 2.5 times the acoustic resonance period (ARP); and
   wherein any non-ejecting pulse having an amplitude A2 present during the idle time period complies with the relationship: $A2 \leq 0.15 \times A3$.

2. The grayscale inkjet printing method of claim 1, wherein no non-ejecting pulse is present during the idle time period.

3. The grayscale inkjet printing method of claim 1, wherein the grayscale print head is a piezoelectric through-flow grayscale print head.

4. The grayscale inkjet printing method of claim 1, wherein the time period, defining the idle time period, has a duration between 1.75 to 2.25 times the acoustic resonance period (ARP).

5. The grayscale inkjet printing method of claim 1, wherein jetting cycle is between 2.5 and 3.5 times the acoustic resonance period (ARP) and/or the acoustic resonance period (ARP) has a duration between 3.0 μs and 5.2 μs.

6. The grayscale inkjet printing method of claim 1, wherein the relationship for the ejecting pulses having amplitude A1 and A3 is $0.65 \times A3 < A1 < 0.90 \times A3$.

7. The grayscale inkjet printing method of claim 1, further applying a voltage wave form for not ejecting the pigmented inkjet ink from a nozzle of the grayscale print head within one jetting cycle, wherein the voltage wave form includes a non-ejecting pulse having an amplitude A2 complying with the relationship: $0.10 \times A3 < A2 < 0.30 \times A3$; and/or
   further applying a voltage wave form for ejecting the pigmented inkjet ink from a nozzle of the grayscale print head within one jetting cycle, wherein the voltage wave form includes, in chronological order, a non-ejecting pulse having an amplitude A2 complying with the relationship: $0.10 \times A3 < A2 < 0.30 \times A3$ and an ejecting pulse having an amplitude A3.

8. The grayscale inkjet printing method of claim 1, wherein the pigmented inkjet ink is an aqueous pigmented inkjet ink ejected at a jetting temperature of at least 25° C.

9. The grayscale inkjet printing method of claim 8, wherein the water content of the aqueous pigmented inkjet ink is more than 50 wt. % based on the total weight of the aqueous pigmented inkjet ink.

10. A method of manufacturing decorative panels comprising the steps of:
   a) printing a décor paper with the grayscale inkjet printing method of claim 9;
   b) impregnating the printed décor paper with a thermosetting resin;
   c) heat pressing the thermosetting resin impregnated printed décor paper into a decorative laminate; and
   d) cutting the decorative laminate into decorative panels selected from the group consisting of flooring, kitchen, furniture, and wall panels.

11. A manufacturing method of printed corrugated cardboard comprising the steps of:
   a) providing a paper liner board with an ink receiving layer; and
   b) inkjet printing an image onto the ink receiving layer with the grayscale inkjet printing method of claim 9.

12. The grayscale inkjet printing method of claim 8, wherein the ejected aqueous pigmented inkjet ink is a red and/or yellow aqueous inkjet ink selected from an aqueous inkjet ink set comprising:

a cyan aqueous inkjet ink containing a beta-copper phthalocyanine pigment;

a red aqueous inkjet ink containing a pigment selected from the group consisting of C.I. Pigment Red 57/1, C.I. Pigment Red 122, C.I. Pigment Red 170, C.I. Pigment Red 175, C.I. Pigment Red 176, C.I. Pigment Red 187, C.I. Pigment Red 188, C.I. Pigment Red 207, C.I. Pigment Red 242, C.I. Pigment Red 254, C.I. Pigment Red 272 and mixed crystals thereof, a yellow aqueous inkjet ink containing a pigment selected from C.I. Pigment Yellow 74 C.I. Pigment Yellow 83, C.I. Pigment Yellow 97, C.I. Pigment Yellow 110, C.I. Pigment Yellow 120, C.I. Pigment Yellow 138, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof; and a black aqueous inkjet ink containing a carbon black pigment.

13. A method of manufacturing decorative panels comprising the steps of:
a) printing a décor paper with the grayscale inkjet printing method of claim 12;
b) impregnating the printed décor paper with a thermosetting resin;
c) heat pressing the thermosetting resin impregnated printed décor paper into a decorative laminate; and
d) cutting the decorative laminate into decorative panels selected from the group consisting of flooring, kitchen, furniture, and wall panels.

14. A manufacturing method of printed corrugated cardboard comprising the steps of:
a) providing a paper liner board with an ink receiving layer; and
b) inkjet printing an image onto the ink receiving layer with the grayscale inkjet printing method of claim 12.

15. A method of manufacturing decorative panels comprising the steps of:
a) printing a décor paper with the grayscale inkjet printing method of claim 8;
b) impregnating the printed décor paper with a thermosetting resin;
c) heat pressing the thermosetting resin impregnated printed décor paper into a decorative laminate; and
d) cutting the decorative laminate into decorative panels selected from the group consisting of flooring, kitchen, furniture, and wall panels.

16. A manufacturing method of printed corrugated cardboard comprising the steps of:
a) providing a paper liner board with an ink receiving layer; and
b) inkjet printing an image onto the ink receiving layer with the grayscale inkjet printing method of claim 8.

17. An inkjet printing system comprising:
a) a piezoelectric through flow grayscale print head including modules having a nozzle with an outer nozzle surface area smaller than 500 µm$^2$, an ink chamber connected to the nozzle, and an actuator connected to the ink chamber to vary a volume of the ink chamber, wherein the ink chamber has an acoustic resonance period (ARP) of not more than 5.5 µs and is supplied with a pigmented inkjet ink having a viscosity of at least 3.8 mPa·s at jetting temperature and a shear rate of 1,000 s$^{-1}$; and
b) a voltage wave form generating device configured to generate a voltage wave form for ejecting the largest ink droplet within one jetting cycle including, in chronological order, a first ejecting pulse having an amplitude A1 and a second ejecting pulse having an amplitude A3 with the amplitude A1 complying with the relationship:

$$0.50 \times A3 < A1 < 1.40 \times A3; \text{ and}$$

wherein a time period between the end time of the first ejecting pulse and the end time of the second ejecting pulse defines an idle time period including no other ejecting pulse, the time period having a duration between 1.5 to 2.5 times the acoustic resonance period (ARP); and wherein any non-ejecting pulse having an amplitude A2 present during the idle time period complies with the relationship: A2≤0.15×A3.

18. The inkjet printing system of claim 17, the voltage wave form generating device further configured to generate a voltage wave form for not ejecting the pigmented inkjet ink from a nozzle of the grayscale print head within one jetting cycle, wherein the voltage wave form includes a non-ejecting pulse having an amplitude A3 complying with the relationship:

$$0.10 \times A3 < A2 < 0.30 \times A3; \text{ and/or}$$

further configured to generate a voltage wave form for ejecting the pigmented inkjet ink from a nozzle of the grayscale print head within one jetting cycle, wherein the voltage wave form includes, in chronological order, a non-ejecting pulse having an amplitude A2 complying with the relationship:

$$0.10 \times A3 < A2 < 0.30 \times A3 \text{ and an ejecting pulse having an amplitude } A3.$$

19. The inkjet printing system of claim 18, wherein the jetting cycle is between 2.5 and 3.5 times the acoustic resonance period (ARP) and/or the acoustic resonance period (ARP) has a duration between 3.0 µs and 5.2 µs.

20. The inkjet printing system of claim 17, wherein the jetting cycle is between 2.5 and 3.5 times the acoustic resonance period (ARP) and/or the acoustic resonance period (ARP) has a duration between 3.0 µs and 5.2 µs.

* * * * *